US009227491B1

(12) United States Patent
Story, Jr. et al.

(10) Patent No.: US 9,227,491 B1
(45) Date of Patent: Jan. 5, 2016

(54) SLIDABLE COVER FOR TRUCK RACK

(71) Applicants: James K. Story, Jr., Sonora, CA (US); Deborah J. Caudill, Sonora, CA (US)

(72) Inventors: James K. Story, Jr., Sonora, CA (US); Deborah J. Caudill, Sonora, CA (US)

( * ) Notice: Subject to any disclaimer, the term of this patent is extended or adjusted under 35 U.S.C. 154(b) by 0 days.

(21) Appl. No.: 14/451,349

(22) Filed: Aug. 4, 2014

(51) Int. Cl.
*B60P 7/02* (2006.01)
*B60J 7/04* (2006.01)

(52) U.S. Cl.
CPC ... *B60J 7/041* (2013.01); *B60P 7/02* (2013.01)

(58) Field of Classification Search
CPC .......... B60J 7/102; B60J 7/1858; B60J 7/104; B60J 7/02
USPC ............................................ 296/100.03, 1.03
See application file for complete search history.

(56) References Cited

U.S. PATENT DOCUMENTS

| | | | |
|---|---|---|---|
| 4,848,827 A * | 7/1989 | Ou | 296/99.1 |
| 6,105,840 A * | 8/2000 | Trevino et al. | 224/310 |
| 6,425,508 B1 * | 7/2002 | Cole et al. | 224/320 |
| 7,654,423 B1 * | 2/2010 | Christiansen | 224/321 |
| 2004/0026472 A1 * | 2/2004 | Foo et al. | 224/310 |
| 2006/0285954 A1 * | 12/2006 | Neary | 414/465 |
| 2010/0252595 A1 * | 10/2010 | Heuchert et al. | 224/315 |
| 2011/0079621 A1 * | 4/2011 | Byers et al. | 224/321 |
| 2011/0127790 A1 * | 6/2011 | Mokhtari et al. | 296/3 |
| 2012/0074187 A1 * | 3/2012 | Gobart | B60R 9/045 224/321 |
| 2013/0032619 A1 * | 2/2013 | Lang | 224/315 |

* cited by examiner

*Primary Examiner* — Pinel Romain

(74) *Attorney, Agent, or Firm* — Craig A. Simmermon

(57) ABSTRACT

A slidable cover for truck rack comprising an impermeable horizontal cover plate that is slideably attached to an existing truck rack or cargo rack on a vehicle so that the cover plate remains fixed in the vertical direction but is slidable in a horizontal direction so that the cover plate may be slid back and forth horizontally to move the protection area that the cover plate provides. Cover plate may be slid rearwards to provide shelter over the rear of the vehicle or cover plate may be slid forwards to provide shelter over the cargo area of the vehicle.

2 Claims, 9 Drawing Sheets

SLIDABLE COVER FOR TRUCK RACK

BACKGROUND OF THE INVENTION

1. Field of the Invention

This invention relates truck bed covers or truck cargo area covers that are attached to a truck rack or cargo rack. A truck rack or cargo rack is a rigid framework or rigid structure that is mounted in or above the bed or cargo area of a pickup truck, utility truck, truck, or other vehicle. Truck racks or cargo racks are used to support and secure long cargo items, such as a ladders, pipes, lumber, or other long cargo items above the truck or vehicle cab, because the long cargo items are otherwise too long to fit in the truck bed in a stable fashion. This invention is a slidable rigid cover that attaches to a truck rack or cargo rack to provide cover or shelter for the truck bed, cargo area, and cargo where the rigid cover can be reversibly slid or moved rearward to cover the tailgate and ground area behind the truck to provide cover or shelter for the tailgate area and area behind the truck bed. Slidable rigid cover can also be used as a cargo carrying platform

2. Description of Related Art

There are truck bed covers and truck cargo covers in the prior art however there are none that disclose a rigid reversibly slideably attached horizontal cover that is attachable to an existing truck rack or cargo rack with the sliding mechanisms as described here within this patent application.

BRIEF SUMMARY OF THE INVENTION

It is an aspect of slidable cover for truck rack to be attachable to an existing truck rack or cargo rack that is attached to a pickup truck, utility truck, truck, or other vehicle.

It is an aspect of slidable cover for truck rack to include an impermeable shield or cover that is positioned horizontally above the bed area or cargo area of a truck, pickup truck, or other vehicle to provide a cover, a guard, or shelter for the truck bed, cargo area that is impermeable to sunlight, rain, and the weather.

It is an aspect of impermeable shield or cover to be a rectangular planar member with length and width that is similar to or slightly larger than those of the truck bed or cargo area of the truck, pickup truck, or other vehicle.

It is an aspect of impermeable shield or cover to be a load-bearing member that can support people and/or cargo on its upper surface.

It is an aspect of impermeable shield or cover to function as a work platform.

It is an aspect of impermeable shield or cover to be mobile in that it is attached to a pickup truck, utility truck, truck, or other vehicle.

It is an aspect of impermeable shield or cover to be reversibly slideably attached to the truck rack or cargo rack.

It is an aspect of the reversible slidable attachment of impermeable shield or cover to allow the impermeable shield or cover to reversibly slide rearwards of the truck, pickup truck, or other vehicle so that the impermeable shield or cover can be moved horizontally rearwards in order to cover the tailgate area of the pickup truck, utility truck, truck, or other vehicle and the ground area behind the pickup truck, utility truck, truck, or other vehicle.

It is an aspect of the slidable attachment of impermeable shield or cover to allow the impermeable shield or cover to reversibly slide forward toward the front of the pickup truck, utility truck, truck, or other vehicle, from the rear location described above, so that the impermeable shield or cover can be moved horizontally forward in order to cover truck bed or cargo area of the truck, pickup truck, or other vehicle.

It is an aspect of the slidable attachment of impermeable shield or cover to allow the impermeable shield or cover to reversibly slide horizontally forward and rearward while preventing the impermeable shield or cover from any movement in the vertical direction and preventing the impermeable shield or cover from any movement in the horizontal direction to either side of the pickup truck, utility truck, truck, or other vehicle thereby holding the impermeable shield or cover in a horizontal orientation at all times, allowing movement only rearwards or forwards.

DEFINITION LIST

Figure 1:
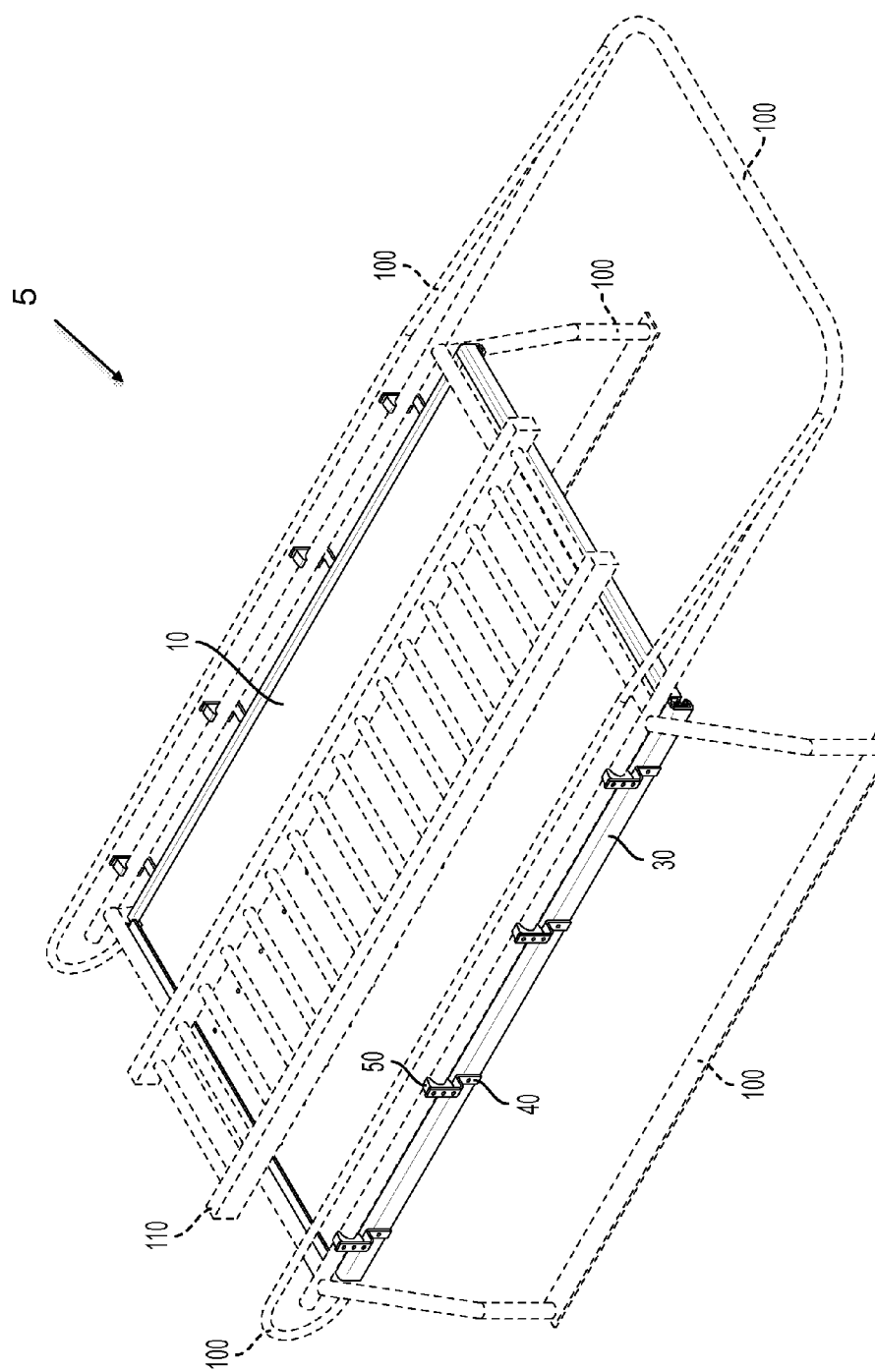
FIG. 1 is a top perspective view of a pickup truck, utility truck, truck, or other vehicle with a truck rack or cargo rack attached thereto, both depicted in dashed lines, with a slidable cover for truck rack attached to the truck rack or cargo rack, where the cover plate is positioned at its forward most location to provide cover or shelter over the full truck bed or cargo area.
Figure 2:
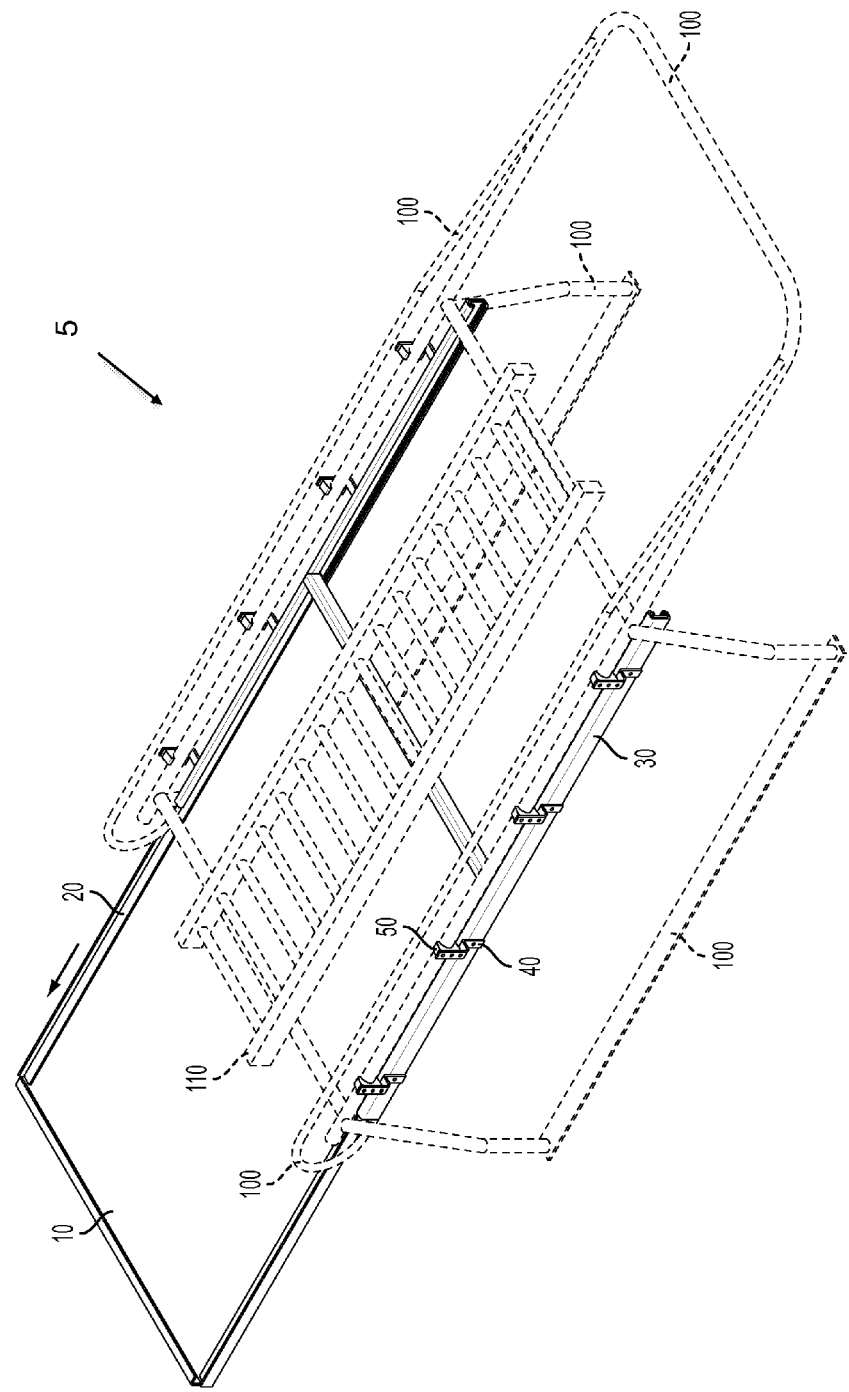
FIG. 2 is a top perspective view of a pickup truck, utility truck, truck, or other vehicle with a truck rack or cargo rack attached thereto, both depicted in dashed lines, with a slidable cover for truck rack attached to the truck rack or cargo rack, where the cover plate is positioned at its rearward most location to provide cover or shelter over the tailgate area of the pickup truck, utility truck, truck, or other vehicle and the ground area behind the pickup truck, utility truck, truck, or other vehicle.
Figure 3:
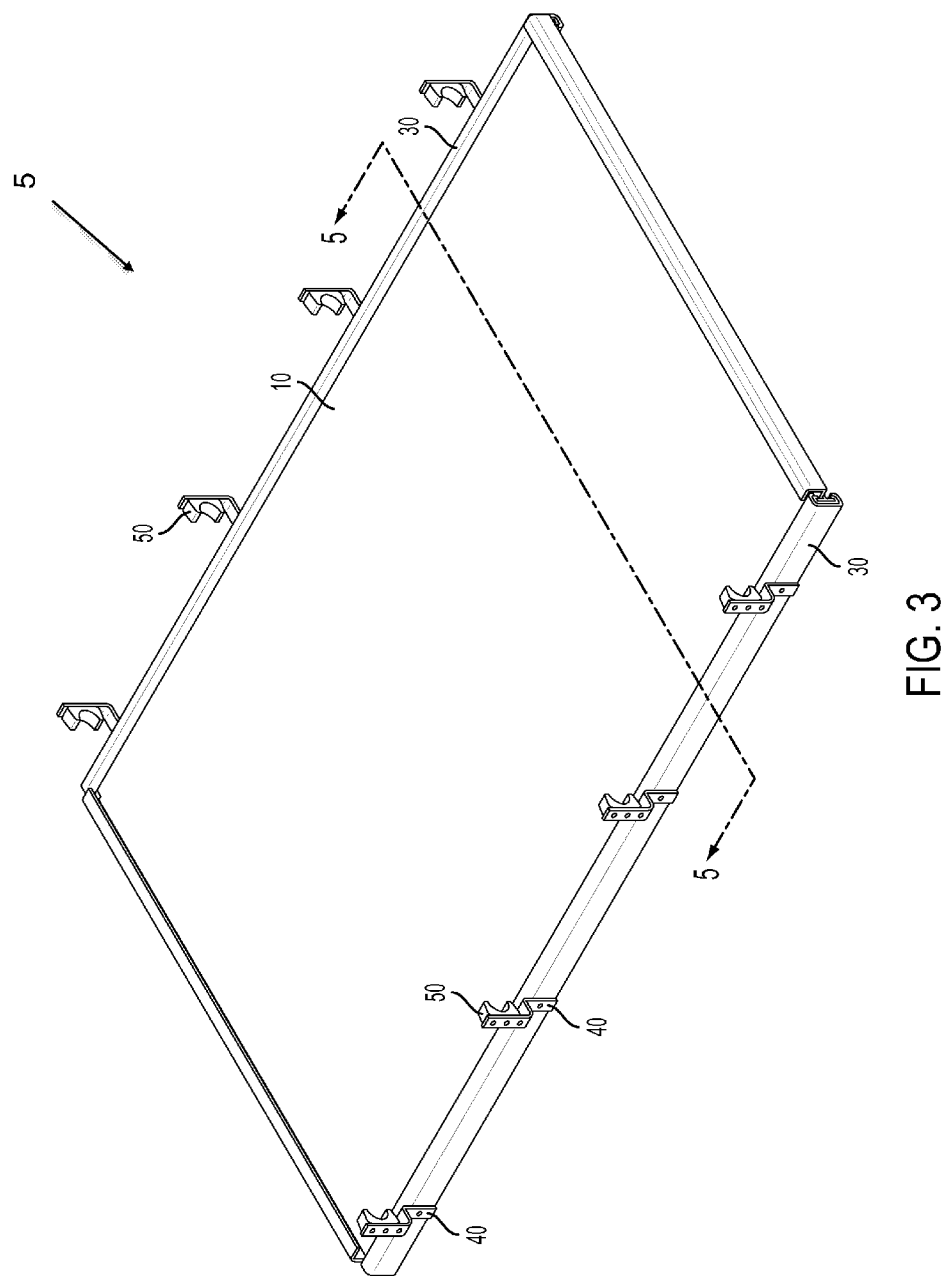
FIG. 3 is a top perspective view of a slidable cover for truck rack defining cross sectional plane 5-5.

| Term | Definition |
| --- | --- |
| 5 | Slidable Cover for Truck Rack |
| 10 | Cover Plate |
| 20 | T-Rail |

-continued

| Term | Definition |
|---|---|
| 30 | C-Channel |
| 35 | Low Friction C-Channel Insert |
| 40 | Offset Bracket |
| 50 | Tube Clamp |
| 60 | Support Beam |
| 70 | Flat Bracket |
| 75 | Weld |
| 80 | Roller Channel |
| 83 | Roller Wheel |
| 86 | Axle |
| 90 | U-Channel |
| 100 | Truck Rack or Cargo Rack |
| 110 | Long Cargo Item |

DETAILED DESCRIPTION OF THE INVENTION

Slidable cover for truck rack 5 comprises: a cover plate 10 and a slidable attachment means to slideably attach cover plate 10 to a truck rack or cargo rack 100. Truck rack or cargo rack 100 is not part of slidable cover for truck rack 5.

Cover plate 10 is a rigid rectangular-shaped planar member with a top surface, a bottom surface, a front edge, a rear edge, a left edge, and a right edge. Cover plate 10 is positioned horizontally above the truck bed. Front edge of cover plate 10 is the edge of the rectangular member that is facing forward on the vehicle or truck on which the truck rack is attached. Rear edge of cover plate 10 is the edge of the rectangular member that is facing rearward on the vehicle or truck on which the truck rack is attached. Left edge of cover plate 10 is the edge of the rectangular member that is facing outward on the driver's side of the vehicle or truck on which the truck rack is attached. Right edge of cover plate 10 is the edge of the rectangular member that is facing outward on the passenger's side of the vehicle or truck on which the truck rack is attached. Rectangular member has length and width that is similar to or slightly larger than those of the truck bed or cargo area. Cover plate 10 has thickness of about 0.1-2 inches. Cover plate 10 is a solid member without holes or gaps that is impermeable to sunlight, rain, and the weather. Cover plate 10 is a protection barrier against the environment. Cover plate 10 shields the truck bed or cargo area and its contents from damage caused by the environment and weather. Cover plate 10 is a strong and sturdy member that can support a large amount of weight on its top surface or bottom surface without buckling, bending, or bowing. Cover plate 10 also functions as a support member to support people and/or cargo on its upper surface. Cover plate 10 can be a work platform. Cover plate 10 may be made of metal, wood, plastic, fiberglass, ceramic, or composite material.

Optionally, the front edge and/or the rear edge of cover plate 10 may be rolled or bent to add strength and rigidity to the planar member. A planar member with one or more rolled or bent edges is typically stronger and more rigid than a planar member without such. A rolled edge is an edge of the planar member that has been curled back or rolled back so that the edge no longer faces outward from the center of the rectangular member but rather faces in any other direction, such as, inward to the center of the rectangular member. A rolled edge of this sort has a cross-section shaped like a "C" because the edge is rolled back to face the opposite direction like a "C". Best mode is a C-rolled edge on both the front and rear edges of cover plate 10. Alternately, the rolled edge could be rolled just slightly to face upwards, for instance. The rolled edge could be rolled around completely to form a circular cross-section for instance. The rolled edge could be rolled to any degree. A bent edge is a bend at an end of the rectangular member so that the bent edge no longer faces outward from the center of the rectangular member but rather faces in any other direction. The ends of the rolled or bent edge on the front edge of cover plate 10 must be removed, as depicted, to allow the rolled or bent edge on the front edge to clear the C-channels 30 as the cover plate 10 is slid rearwards and forwards, as detailed below. Similarly, the ends of the rolled or bent edge on the rear edge of cover plate 10 may also be removed. The length of a rolled or bent edge including the perimeter of the roll or bend is about 0.2-5 inches. Bending or rolling of cover plate 10 is typically accomplished by a press, die, or brake, but may be accomplished by any known means.

Figure 4:
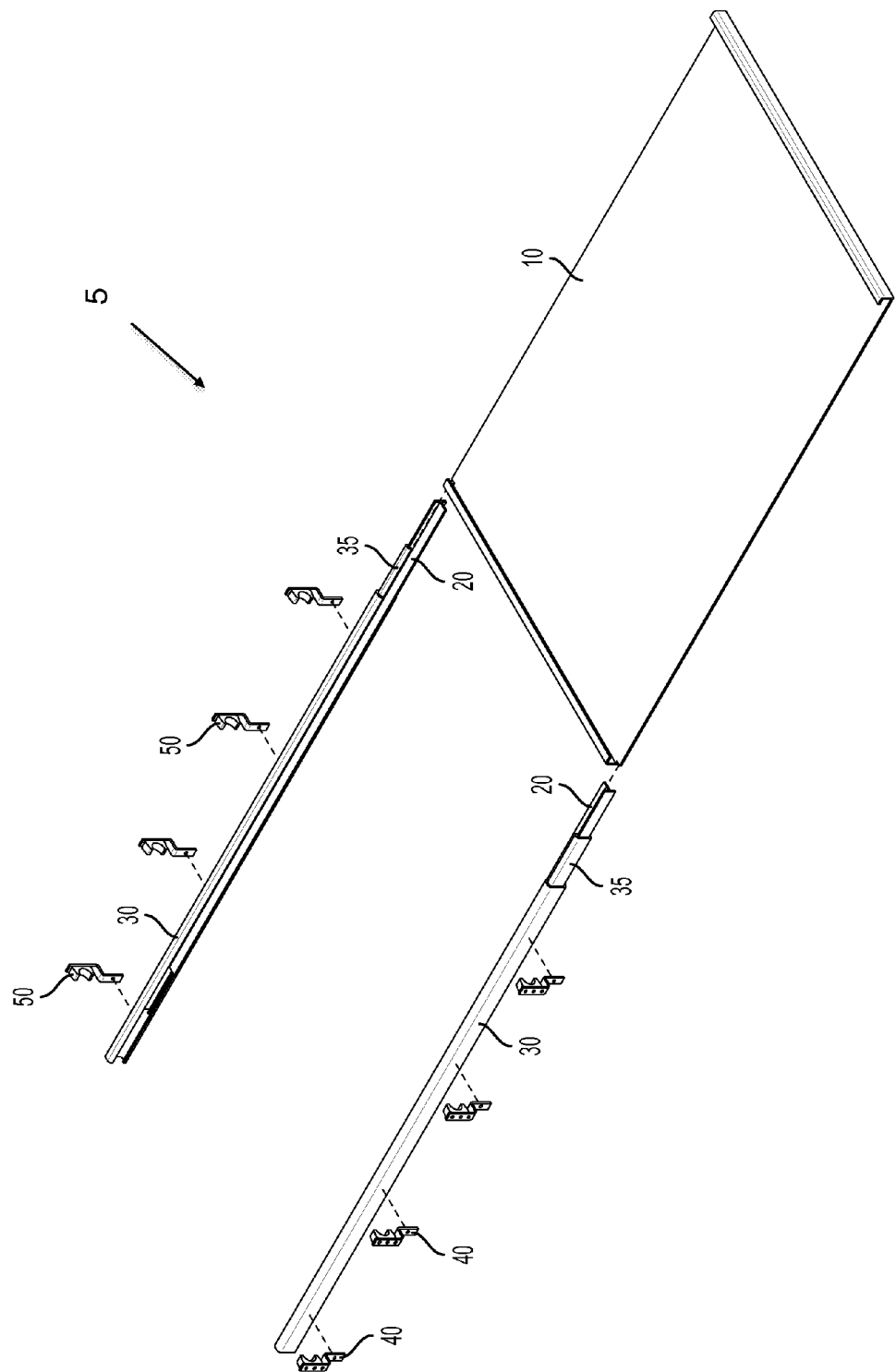
FIG. 4 is an exploded view of a slidable cover for truck rack.
Figure 4A:
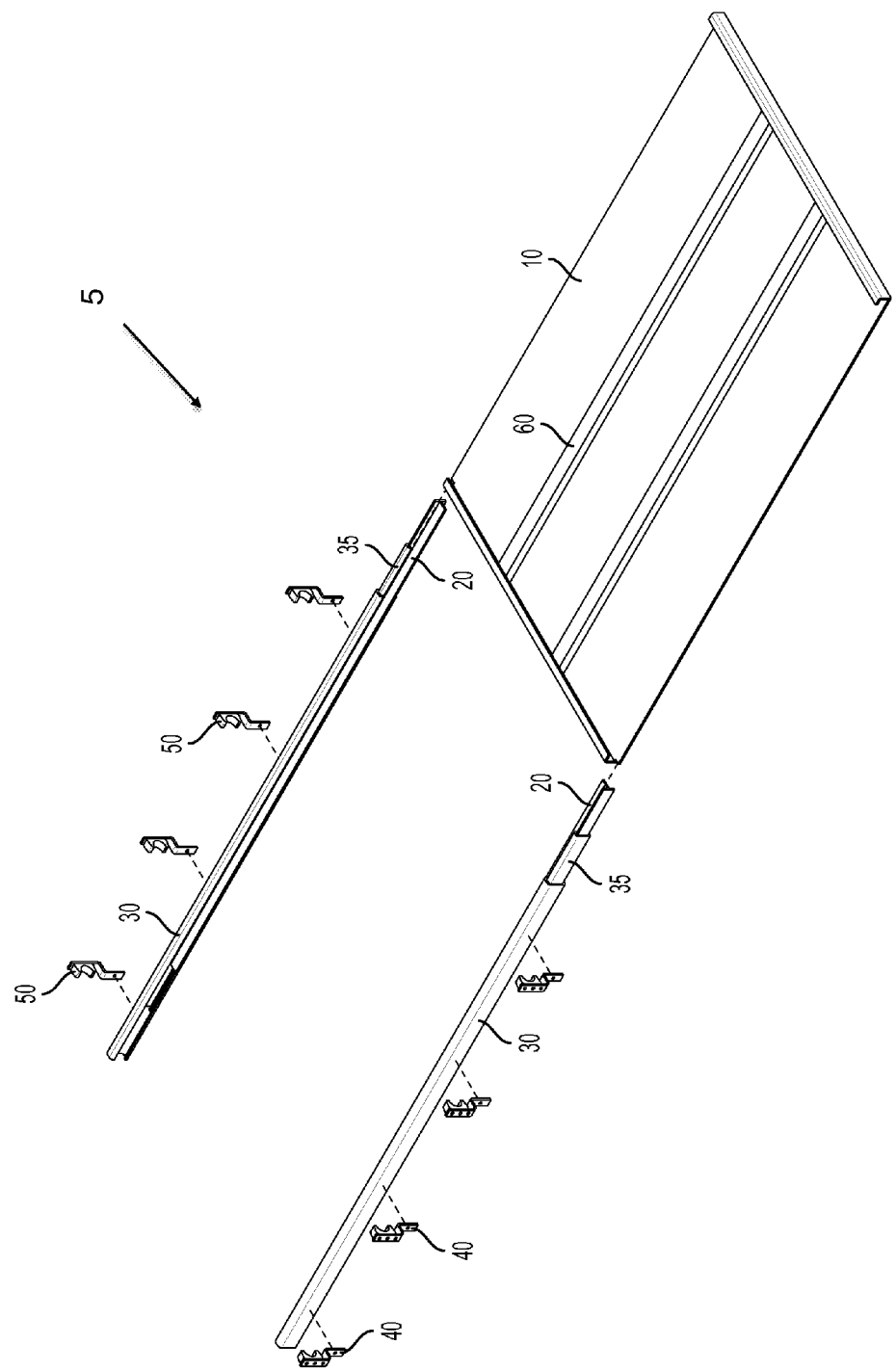
FIG. 4A is an exploded view of a slidable cover for truck rack with two longitudinal support beams attached to the upper surface of cover plate.
Figure 5:
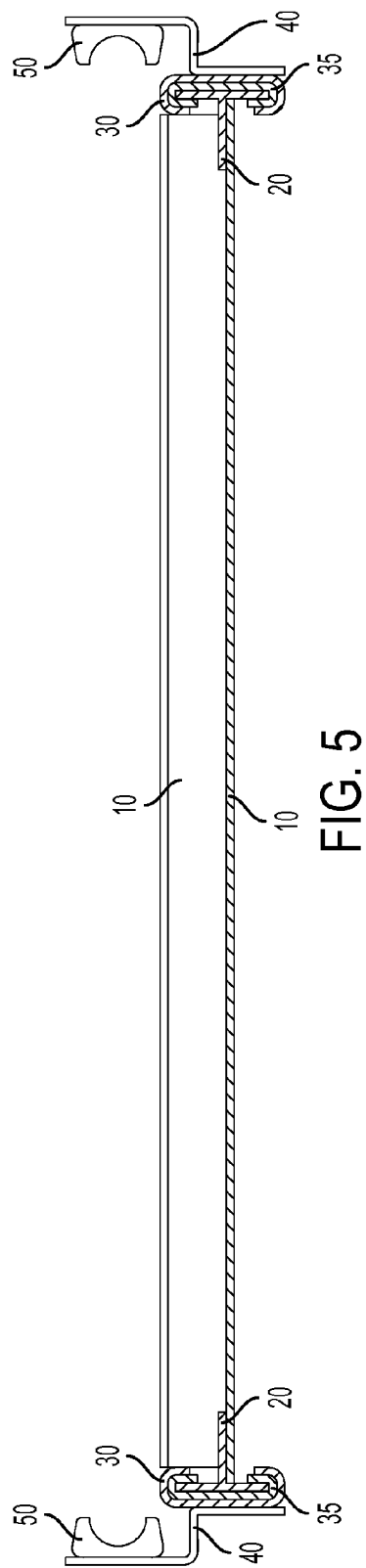
FIG. 5 is a cross sectional view of a slidable cover for truck rack taken from lines 5-5 in FIG. 3.
Figure 5A:
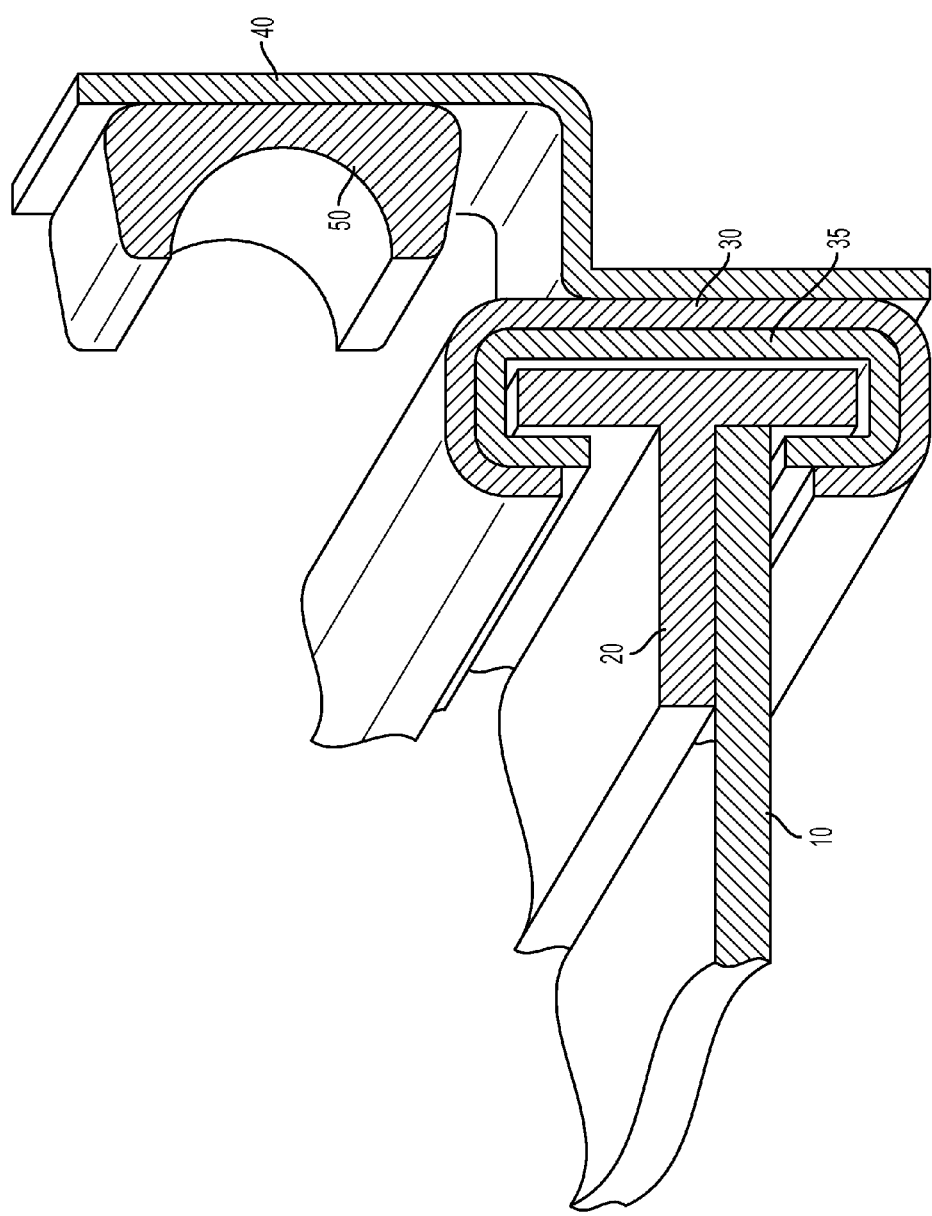
FIG. 5A is a blow-up cross sectional view of cover plate rigidly attached to a T-rail that is nested inside a C-channel to yield reversible slidable attachment between T-rail and C-channel.
Figure 6:
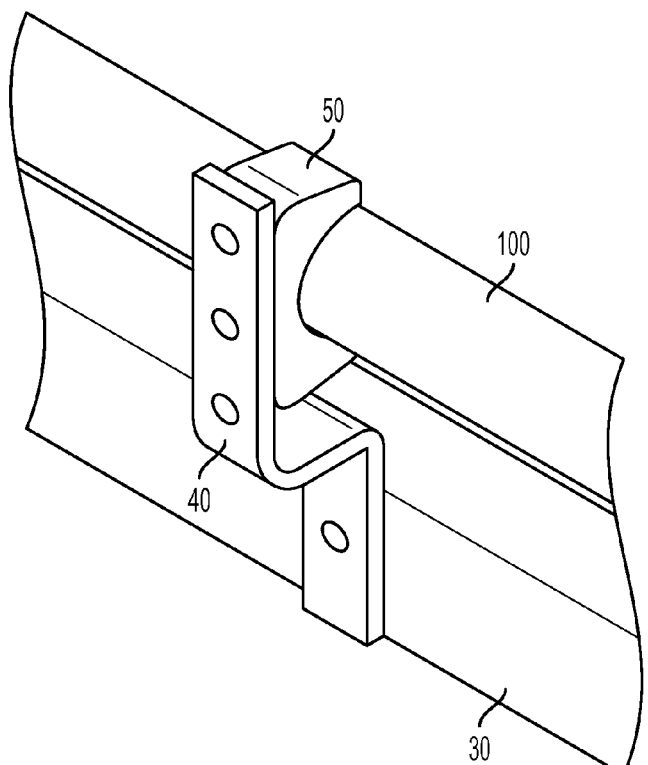
FIG. 6 is a blow-up view of rigid attachment C-channel to truck rack using best mode attachment means with tube clamps and offset brackets.
Figure 7:
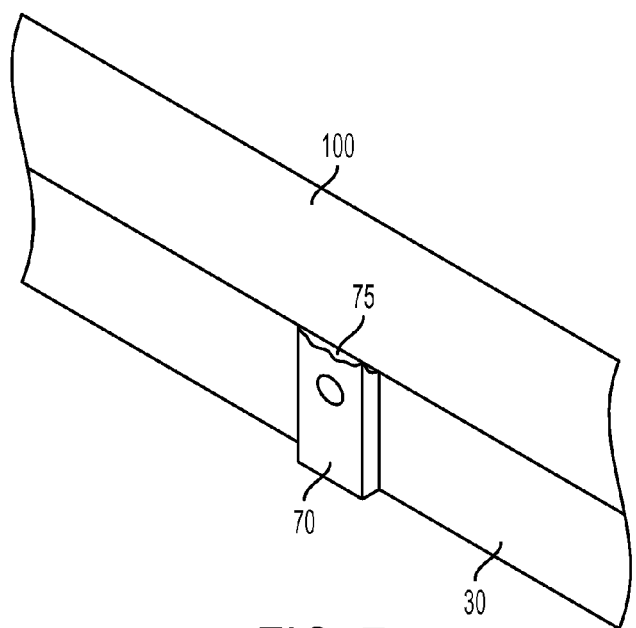
FIG. 7 is a blow-up view of rigid attachment C-channel to truck rack using attachment means with flat brackets welded to the truck rack.

Optionally, cover plate 10 may further comprise one or more support beams 60. A support beam 60 is a rigid oblong member. Each support beam is a strong and sturdy member that can support a large amount of weight or deflection pushing against the side of the oblong member without buckling, bending, or bowing. Each support beam 60 is rigidly attached to the top surface of cover plate 10 or the bottom surface of cover plate 10. Rigid attachment may be accomplished by bolts, screws, rivets, nails, staples, glue, adhesive, epoxy, welding, brazing, bronzing, or any other known means. Rigid attachment is accomplished without exposed holes or gaps and is impermeable to sunlight and rain. Cover plate 10 with one or more support beams 60 attached thereto is a protection barrier against the environment and weather. The rigid attachment of support beams 60 to a surface of cover plate 10 adds strength and rigidity to assembly of these two members. With one or more support beams 60 rigidly attached to a surface of cover plate 10 to increase strength and rigidity of the assembly, the thickness of cover plate 10 may be greatly reduced to decrease the weight and cost of the cover plate 10 to yield a substantial overall net reduction in weight and cost of the entire slidable cover for truck rack 5. In best mode, there are two support beams 60 attached to the upper surface of cover plate 10, each with length that is similar to that of cover plate 10, where the ends of each support beam 60 are aligned with the front and rear edges of cover plate 10, respectively, the longitudinal axis of each support beam 60 is parallel to the longitudinal axis of cover plate 10, and the two support beams 60 are evenly spaced across the width of cover plate 10 at one third and two thirds as depicted in FIG. 4A. With this configuration, an assembly with a very thin cover plate 10 can support an enormous amount of weight on the top surface without buckling, bending, or bowing to yield an aggregate product that is a relatively low weight and relatively low cost slidable cover for truck rack 5.

Slidable attachment means to slideably attach cover plate 10 to a truck rack or cargo rack 100 may comprise: a set of two T-rails 20, a set of two C-channels 30, and a rigid attachment means to rigidly attach each C-channel 30 to the truck rack or cargo rack 100.

Each T-rail 20 is a rigid oblong member with a front end and a rear end. The length of each T-rail 20 matches the length of cover plate 10. Each T-rail 20 has a profile or cross-section shaped like a "T" running across the entire length of the oblong shape. Each T-rail 20 is a strong and sturdy member that can support a large amount of weight or deflection pushing against the side of the oblong member without buckling, bending, or bowing. The T-shaped profile has a base segment and two branch segments to form the "T" shape. Each T-rail 20 is positioned horizontally with front and rear ends aligned with the front and rear ends of cover plate 10 respectively.

The left edge of cover plate 10 is rigidly attached to one T-rail 20 with the oblong member positioned parallel and adjacent to the left edge of cover plate 10. The left edge of cover plate 10 is parallel and adjacent with the base segment of T-rail 20. The left edge of cover plate 10 overlaps with the base segment of T-rail 20 as depicted in FIGS. 1-5A. Thus, the two branch segments of T-rail 20 are perpendicular to the plane of the cover plate 10. With this overlap, the base segment of T-rail 20 is rigidly attached to the left edge of cover plate 10. The right edge of cover plate 10 is rigidly attached to the other T-rail 20 with the oblong member positioned parallel with and adjacent to the right edge of cover plate 10. The right edge of cover plate 10 is parallel and adjacent with the base segment of T-rail 20. The right edge of cover plate 10 overlaps with the base segment of T-rail 20 as depicted in FIGS. 1-5A. Thus, the two branch segments of T-rail 20 are perpendicular to the plane of the cover plate 10. With this overlap, the base segment of T-rail 20 is rigidly attached to the right edge to cover plate 10. This overlap may occur with the cover plate 10 above or below the base segments of the two T-rails 20. In best mode, cover plate 10 is positioned below the base segments of the two T-rails 20. Rigid attachment may be accomplished by bolts, screws, rivets, nails, staples, glue, adhesive, epoxy, welding, brazing, bronzing, or any other known means. Rigid attachment is accomplished without exposed holes or gaps and is impermeable to sunlight, rain, and the weather. Cover plate 10 with two T-rails 20 attached thereto is a protection barrier against the environment and weather. The attachment of the two T-rails to cover plate 10 as described above yields a cover plate assembly with two ear members or tabs running along the left and right edges of cover plate 10 that are the branch members of each T-rail 20. Each set of two ear members or tabs forms an exact slip fit with a C-channel 30 that is rigidly attached to truck rack or cargo rack 100. This exact slip fit connection is the essence of this slidable attachment means to slideably attach cover plate 10 to a truck rack or cargo rack 100, which includes a set of two T-rails 20, a set of two C-channels 30, and a rigid attachment means to rigidly attach each C-channel 30 to the truck rack or cargo rack 100.

Each C-channel 30 is a rigid oblong member with a front end and a rear end. The length of each C-channel 30 matches the length of cover plate 10. Each C-channel 30 has a profile or cross-section shaped like a "C" running across the entire length of the oblong shape. Each C-channel 30 is a strong and sturdy member that can support a large amount of weight or deflection pushing against the side of the oblong member without buckling, bending, or bowing. Each C-channel 30 is rigidly attached to truck rack or cargo rack 100 with front and rear ends aligning with the front and rear ends of cover plate 10 respectively with cover plate positioned at its forward most location to provide cover or shelter over the full truck bed or cargo area.

The interior of the C-shaped profile must be sized to make an exact slip fit with exterior of T-rail 20, or vice versa, so that the branch members of T-rail 20 may slide horizontally within the interior of C-channel 30 with an exact slip fit between these members so that there is enough clearance space so that T-rail 20 may be easily slid horizontally within C-channel 30 but not to much clearance space so that T-rail may move vertically within C-channel 30 to any appreciable degree.

Optionally, each C-channel 30 may further comprise a low friction C-channel insert 35 to decrease friction forces between C-channel 30 and T-rail 20. Each C-channel insert 35 is a rigid oblong member with a front end and a rear end. The length of each C-channel insert 35 matches the length of C-channel 30. Each C-channel insert 35 has a profile or cross-section shaped like a "C" running across the entire length of the oblong shape. The exterior of the C-channel insert 35 must be sized to make a press fit within the interior of C-channel 30 so that C-channel insert 35 may be pressed into C-channel 30 into position as depicted to cause a friction between these members without clearance space so that C-channel insert 35 is firmly held within C-channel 30 without any appreciable movement between these members. The interior of the C-channel insert 35 must be sized to make an exact slip fit with exterior of T-rail 20, or vice versa, so that the branch members of T-rail 20 may slide horizontally within the interior of C-channel insert 35 with an exact slip fit between these members so that there is enough clearance space so that T-rail 20 may be easily slid horizontally within C-channel insert 35 but not to much clearance space so that T-rail may move vertically within C-channel insert 35 to any appreciable degree. Best mode C-channel 30 includes C-channel insert 35.

Rigid attachment means to rigidly attach each C-channel 30 to the truck rack or cargo rack 100 may comprise: a plurality of offset brackets 40 and a plurality of tube clamps 50. In best mode, there are eight offset brackets 40 and eight tube clamps 50 with four pairs of each on each side of cover plate 10 as depicted. Each offset bracket 40 is a rigid oblong planar member or bent into a step-shape with two steps as depicted. Each offset bracket 40 has a truck rack step at one end and a cover plate step at the other end. The truck rack step of each offset bracket 40 is rigidly attached to a tube clamp 50. Rigid attachment may be accomplished by bolts, screws, rivets, nails, staples, glue, adhesive, epoxy, welding, brazing, bronzing, or any other known means. Each tube clamp 50 is a tube clamp member in that it has a cylindrically shaped void on one end that is the inverse shape of a cylindrical-shaped member or tube member on truck rack or cargo rack 100. Each tube clamp is rigidly attached to the cylindrical-shaped member on truck rack or cargo rack 100 with the cylindrical-shaped member nested within the cylindrically shaped void as depicted. Rigid attachment may be accomplished by bolts, screws, rivets, nails, staples, glue, adhesive, epoxy, welding, brazing, bronzing, or any other known means. In best mode, both the tube clamp rigid attachment to truck rack or cargo rack 100 and the tube clamp rigid attachment to the truck rack step of offset bracket 40 is accomplished by one U-bolt (not depicted). The U-bolt sandwiches the tube clamp 50 and truck rack or cargo rack 100 between the offset bracket 40 and the U-bolt to squeeze and secure these members together to form a rigid attachment offset bracket 40 to truck rack or cargo rack 100. The cover plate step is rigidly attached to a C-channel 30. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted).

Rigid attachment means to rigidly attach each C-channel 30 to the truck rack or cargo rack 100 may comprise: a plurality of flat brackets 70. Each flat bracket 70 is rigidly attached to a C-channel 30. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted). Each flat bracket is also rigidly attached to the truck rack or cargo rack 100. Rigid attachment may be accomplished by bolts, welded studs, screws, rivets, nails, staples, glue, adhesive, epoxy, welding, brazing, bronzing, or any other known means. In best mode, rigid attachment is accomplished by weld 75.

Alternately, slidable attachment means to slideably attach cover plate 10 to a truck rack or cargo rack 100 may comprise:

a set of two roller channels 80 and a rigid attachment means to rigidly attach each roller channel 80 to the truck rack or cargo rack 100.

Each roller channel 80 is a rigid oblong member with a front end and a rear end. The length of each roller channel 80 matches the length of cover plate 10. Each roller channel 80 has a profile or cross-section shaped like a "C" running across the entire length of the oblong shape. Each roller channel 80 is a strong and sturdy member that can support a large amount of weight or deflection pushing against the side of the oblong member without buckling, bending, or bowing. Each roller channel 80 is rigidly attached to truck rack or cargo rack 100 with front and rear ends aligning with the front and rear ends of cover plate 10 respectively with cover plate positioned at its forward most location to provide cover or shelter over the full truck bed or cargo area.

Figure 8:
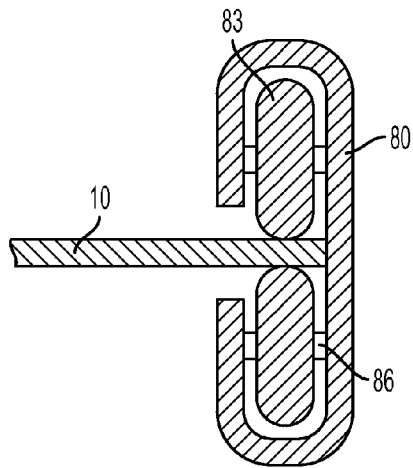
FIG. 8 is a blow-up cross sectional view of cover plate sandwiched between a pair of two roller wheels in a roller channel to yield reversible slidable attachment of cover plate to roller channel.

The interior of each roller channel 80 includes a plurality of roller wheels 83 with each pivotally attached to roller channel 80 with an axle 86. Two rows of roller wheels 83 are positioned in side-by-side along the full length of each roller channel 80, one row of in the top section of the C cross section and one row in the bottom of the C cross section, as depicted in FIG. 8. Adjacent roller wheels 83 in each row form pairs of roller wheels 83. FIG. 8 depicts a pair of roller wheels 83. The distance between the outer diameters of each row of roller wheels 83 or each wheel in a pair of roller wheels 83 is the exact thickness of cover plate 10 so that cover plate may freely slide in between each row of roller wheels 83 in the horizontal direction as roller wheels 83 turn or rotate around axle 86. However, roller wheels 83 hold cover plate 10 steady in the vertical direction to allow for slideably movement of cover plate 10 only in the horizontal direction.

Rigid attachment means to rigidly attach each roller channel 80 to the truck rack or cargo rack 100 may comprise: a plurality of offset brackets 40 and a plurality of tube clamps 50. In best mode, there are eight offset brackets 40 and eight tube clamps 50 with four pairs of each on each side of cover plate 10 as depicted. Each offset bracket 40 is a rigid oblong planar member shaped or bent into a step-shape with two steps as depicted. Each offset bracket 40 has a truck rack step at one end and a cover plate step at the other end. The truck rack step of each offset bracket 40 is rigidly attached to a tube clamp 50. Rigid attachment may be accomplished by bolts, screws, rivets, nails, staples, glue, adhesive, epoxy, welding, brazing, bronzing, or any other known means. Each tube clamp 50 is a tube clamp member in that it has a cylindrically shaped void on one end that is the inverse shape of a cylindrical-shaped member or tube member on truck rack or cargo rack 100. Each tube clamp is rigidly attached to the cylindrical-shaped member on truck rack or cargo rack 100 with the cylindrical-shaped member nested within the cylindrically shaped void as depicted. Rigid attachment may be accomplished by bolts, screws, rivets, nails, staples, glue, adhesive, epoxy, welding, brazing, bronzing, or any other known means. In best mode, both the tube clamp rigid attachment to truck rack or cargo rack 100 and the tube clamp rigid attachment to the truck rack step of offset bracket 40 is accomplished by one U-bolt (not depicted). The U-bolt sandwiches the tube clamp 50 and truck rack or cargo rack 100 between the offset bracket 40 and the U-bolt to squeeze and secure these members together to form a rigid attachment offset bracket 40 to truck rack or cargo rack 100. The cover plate step of each offset bracket 40 is rigidly attached to a roller channel 80. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted).

Rigid attachment means to rigidly attach each roller channel 80 to the truck rack or cargo rack 100 may comprise: a plurality of flat brackets 70. Each flat bracket 70 is rigidly attached to a roller channel 80. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted). Each flat bracket is also rigidly attached to the truck rack or cargo rack 100. Rigid attachment may be accomplished by bolts, welded studs, screws, rivets, nails, staples, glue, adhesive, epoxy, welding, brazing, bronzing, or any other known means. In best mode, rigid attachment is accomplished by weld 75.

Alternately, slidable attachment means to slideably attach cover plate 10 to a truck rack or cargo rack 100 may comprise: a set of two U-channels 90 and a rigid attachment means to rigidly attach each U-channel 90 to the truck rack or cargo rack 100.

Each U-channel 90 is a rigid oblong member with a front end and a rear end. The length of each U-channel 90 matches the length of cover plate 10. Each U-channel 90 has a profile or cross-section shaped like a "U" running across the entire length of the oblong shape. There are two branches of the cross section to make the U-shape. Each U-channel 90 is a strong and sturdy member that can support a large amount of weight or deflection pushing against the side of the oblong member without buckling, bending, or bowing. Each U-channel 90 is rigidly attached to truck rack or cargo rack 100 with front and rear ends aligning with the front and rear ends of cover plate 10 respectively with cover plate positioned at its forward most location to provide cover or shelter over the full truck bed or cargo area.

Figure 9:
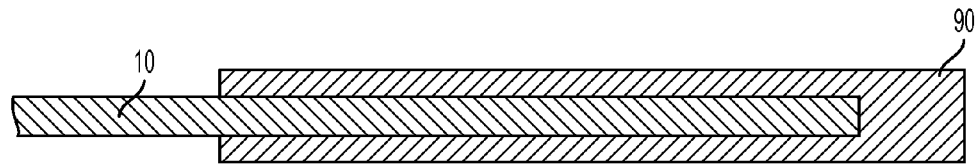
FIG. 9 is a blow-up cross sectional view of cover plate with a slip fit inside a U-channel to yield reversible slidable attachment of cover plate to U-channel.

The internal dimension between each branch of the U-channel 90 equals the exact thickness of cover plate 10 as depicted in FIG. 9 so that cover plate may freely slide in between each branch of U-channel 90 in the horizontal direction. However, the two branches of each U-channel 90 hold cover plate 10 steady in the vertical direction to allow for slideably movement of cover plate 10 only in the horizontal direction.

Rigid attachment means to rigidly attach each U-channel 90 to the truck rack or cargo rack 100 may comprise: a plurality of offset brackets 40 and a plurality of tube clamps 50. In best mode, there are eight offset brackets 40 and eight tube clamps 50 with four pairs of each on each side of cover plate 10 as depicted. Each offset bracket 40 is a rigid oblong planar member shaped or bent into a step-shape with two steps as depicted. Each offset bracket 40 has a truck rack step at one end and a cover plate step at the other end. The truck rack step of each offset bracket 40 is rigidly attached to a tube clamp 50. Rigid attachment may be accomplished by bolts, screws, rivets, nails, staples, glue, adhesive, epoxy, welding, brazing, bronzing, or any other known means. Each tube clamp 50 is a tube clamp member in that it has a cylindrically shaped void on one end that is the inverse shape of a cylindrical-shaped member or tube member on truck rack or cargo rack 100. Each tube clamp is rigidly attached to the cylindrical-shaped member on truck rack or cargo rack 100 with the cylindrical-shaped member nested within the cylindrically shaped void as depicted. Rigid attachment may be accomplished by bolts, screws, rivets, nails, staples, glue, adhesive, epoxy, welding, brazing, bronzing, or any other known means. In best mode, both the tube clamp rigid attachment to truck rack or cargo rack 100 and the tube clamp rigid attachment to the truck rack step of offset bracket 40 is accomplished by one U-bolt (not depicted). The U-bolt sandwiches the tube clamp 50 and truck rack or cargo rack 100 between the offset bracket 40 and the U-bolt to squeeze and secure these members together to form a rigid attachment offset bracket 40 to truck rack or cargo rack 100. The cover plate step of each offset bracket 40 is rigidly attached to a U-channel 90. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted).

Rigid attachment means to rigidly attach each U-channel 90 to the truck rack or cargo rack 100 may comprise: a plurality of flat brackets 70. Each flat bracket 70 is rigidly attached to a U-channel 90. Rigid attachment may be accomplished by bolts, welded studs, screws, rivets, nails, staples, glue, adhesive, epoxy, welding, brazing, bronzing, or any other known means. In best mode, rigid attachment is accomplished by welded studs (not depicted). Each flat bracket is also rigidly attached to the truck rack or cargo rack 100. Rigid attachment may be accomplished by bolts, welded studs, screws, rivets, nails, staples, glue, adhesive, epoxy, welding, brazing, bronzing, or any other known means. In best mode, rigid attachment is accomplished by weld 75.

Any slidable attachment means to slideably attach cover plate may further comprise a locking mechanism which functions to lock cover plate 10 in one or more positions along the cycle of the forward and rearward slidable movement of cover plate 10. For instance, locking mechanism could lock cover plate 10 in its forward most location for use during transport. Locking mechanism could also lock cover plate 10 in its rearward most location to provide shelter or cover for a work area at the tailgate and just behind the tailgate of the pickup truck, utility truck, truck, or other vehicle. Any known means to lock cover plate 10 in a position may be used. Best mode locking mechanism utilizes a spring loaded pin attached to C-channel 30, roller channel 80, or U-channel 90 that is spring loaded to press against the T-rail 20 or cover plate 10 during the cycle of the forward and rearward slidable movement of cover plate 10, where the spring loaded pin falls into one or more holes in the T-rail 20 or cover plate 10 during the cycle of the forward and rearward slidable movement of cover plate 10 to lock therein and lock cover plate 10 into position at the location marked by the hole in T-rail 20 or cover plate 10. The spring-loaded pin may then be pulled to release the locked cover plate 10 for additional movement.

What is claimed is:

1. A slidable cover for truck rack comprising: a cover plate and a slidable attachment means, wherein said cover plate is a rigid horizontal impermeable rectangular-shaped planar member and said slidable attachment means comprises a set of two T-rails, a set of two C-channels, and a set of two offset brackets and is a means to slideably attach said cover plate to an existing truck rack or cargo rack so that said cover plate remains fixed in the vertical direction but is slidable in a horizontal direction and said cover plate may slid back and forth in a horizontal direction.

2. A slidable cover for truck rack as recited in claim 1 further comprising one or more support beams rigidly attached to said cover plate.

* * * * *